United States Patent [19]

Shapero et al.

[11] Patent Number: 5,310,421
[45] Date of Patent: May 10, 1994

[54] PLAY MATERIAL

[75] Inventors: Wallace H. Shapero, West Hills; Susan A. Reyes, Agoura Hills, both of Calif.

[73] Assignee: Mattel, Inc., El Segundo, Calif.

[21] Appl. No.: 832,272

[22] Filed: Feb. 7, 1992

[51] Int. Cl.$^5$ .................................................. C08L 5/04
[52] U.S. Cl. ................................................. 106/208
[58] Field of Search .................................... 106/208

[56] References Cited

U.S. PATENT DOCUMENTS

| | | | |
|---|---|---|---|
| 1,404,345 | 1/1922 | Dales | 106/208 |
| 3,640,741 | 2/1972 | Etes | 106/208 |
| 4,299,231 | 11/1981 | Karmann et al. | 106/208 |
| 4,315,779 | 2/1982 | Heyd et al. | 106/208 |

Primary Examiner—David Brunsman
Attorney, Agent, or Firm—Roy A. Ekstrand

[57] ABSTRACT

A play material is formed using a self cross-linking sodium alginate combined with germaben II-E and butylparaben preservatives. A sodium chloride salt provides further preservative action which increases the firmness of the alginate gel material. The play material exhibits improved preservative action and avoidance of eye and skin irritation problems on the part of the user.

5 Claims, 1 Drawing Sheet

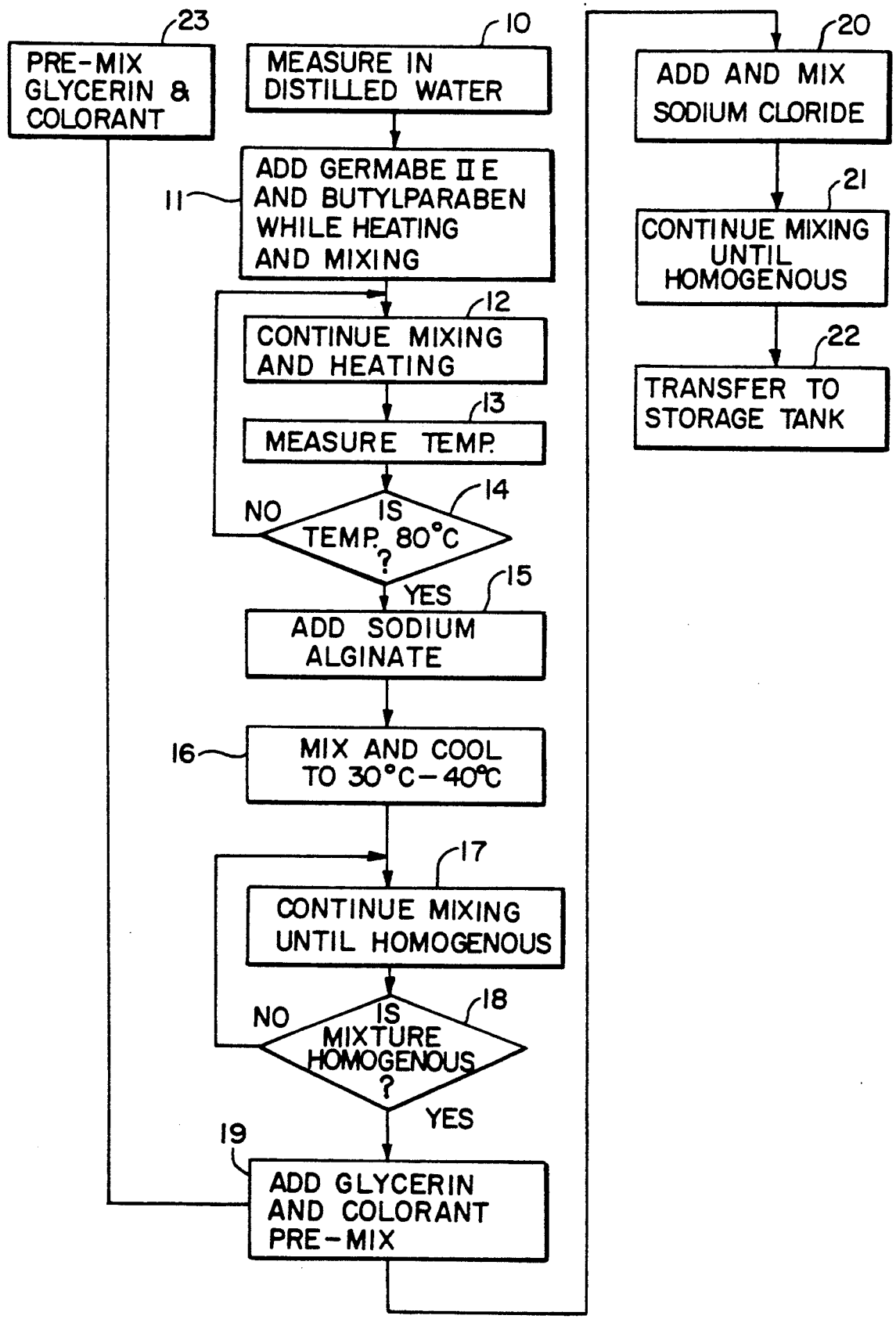

PLAY MATERIAL

FIELD OF THE INVENTION

This invention relates generally to play material compositions and particularly to those intended for available for use by young children.

BACKGROUND OF THE INVENTION

Play compositions of different types have been provided by practitioners in the toy arts through the years to amuse children and adults and to aid in the development of manual skills and dexterity as well as creativity. While the variety of such play material compositions is virtually endless, all generally involve the use of free-forming or malleable materials such as oil base or water base gums and gel compounds which may be manipulated and shaped by the user. Certain materials have been provided which are moldable and tend to retain their shapes such as modeling clay or the like. Others, however, have been provided which are looser and more free-flowing such as novelty play materials and compositions. Still others are gel-like and provide interesting characteristics such as shaking or quivering similar to gelatin dessert products.

Regardless of the type of play material compounds used, it has remained imperative that such materials be safe for young children. Safety requirements have evolved through the years as concerns have grown. Generally safety requirements mandate that play material compositions be non-irritating to the skin or eyes or the like and be non-toxic if ingested. Additional requirements have been employed in certain materials to avoid damage to clothing, upholstery fabric or carpeting.

The continuing need for evermore improved and varied play material compositions has prompted practitioners in the art to develop a great number of such materials. For example, U.S. Pat. No. 2,541,851 issued to Wright sets forth a PROCESS FOR MAKING PUTTYLIKE ELASTIC PLASTIC SILOXANE DERIVATIVE COMPOSITION CONTAINING ZINC HYDROXIDE in which a composition of matter comprises a dimethyl silicone of the type generally known as a "bouncing putty". The invention is directed to a process for making such bouncing putties by treating the dimethyl silicone with a compound of boron preferably followed by further treatment using head and/or a catalyst.

U.S. Pat. No. 3,384,498 issued to Ahrabi sets forth a PLASTIC MODELING COMPOSITION comprising manogalactan gum, alkali metal borate, boric acid, high molecular weight polysaccharide, bacteriostat, fungistat, filler, colorant and perfume.

U.S. Pat. No. 3,565,815 issued to Christy sets forth a PHOSPHOR CONTAINING PLASTIC POLYSTYRENE which provides a moldable plastic product having adhesive properties and which may made to glow in the dark.

U.S. Pat. No. 3,634,280 issued to Dean, et al. sets forth a GLOWING BOUNCING PUTTY in which a non-toxic novelty composition comprises a bouncing putty material possessing unusual properties such as the ability to glow in the dark after exposure to a light source. The putty composition is preferably formed of a solid gel-like heat reaction product of dimethyl silicone oil with a minor portion of a boron compound. In its preferred form, the material is subsequently treated with heat or a catalyst.

U.S. Pat. No. 3,661,790 issued to Dean, et al. sets forth a GLOWING BOUNCING PUTTY similar to that set forth in the above-referenced U.S. Pat. No. 3,634,280.

U.S. Pat. No. 3,804,654 issued to Liu sets forth a MODELING COMPOSITION formed of material fillers such as clay and talc together with hydrocarbon petroleum distillate oil, waxy paraffinic hydrocarbon oil, a liquid silicone compound, an astringent, a humectant, glue and water. The composition is moldable and shapable when initially mixed and properly stored but ultimately takes a permanent set after a predetermined cure time.

U.S. Pat. No. 3,873,485 issued to Fichera sets forth a MOLDABLE AQUEOUS PLASTIC MASS OF POLYETHYLENE OXIDE FUMED SILICA AND POLYGLYCOL which is formable into a plastic mass useful as an entertaining and educating medium. The mass is non-newtonian, has low internal rebound and is thixotropic and may be formed into window glass which is extremely strong and impact resistant.

U.S. Pat. No. 4,076,547 issued to Lester, et al. sets forth a POLYMERIC MOLDING COMPOSITION formed from water soluble compounds admixed from a two part wet phase and dry phase combination comprised from the interaction by nucleophilic substitution of a hydroxyl group of an alcohol.

U.S. Pat. No. 4,172,054 issued to Ogawa, et al. sets forth a MODELING COMPOSITION FOR CRAFT WORKS AND A METHOD FOR THE PRODUCTION THEREFOR in which an improved modeling compound of a soft pliable working consistency formable into any desired shape is provided which is relatively fast drying to assume a permanent shape. A small amount of dibutyl hydroxy-toluene or butyl hydroxy-anisole or both is included in the composition.

U.S. Pat. No. 4,229,790 issued to Greenberg sets forth a METHOD AND COMPOSITION FOR FORMING A PLASTER OBJECT for use in the formation of toy figures and the like. The molding powder mixture includes calcium sulphate hemihydrate combined with xanthan gum. The material once formed dries to form a porous lightweight object.

U.S. Pat. No. 4,624,976 issued to Amano, et al. sets forth a MODELING MATERIAL COMPOSITION comprising a synthetic resin and a wooden powder together with an oil formulation. The synthetic resin is a rubber reinforced styrene resin. The oil used is a hydrocarbon oil utilizing an aromatic ring forming carbon.

U.S. Pat. No. 4,735,660 issued to Cane sets forth a CROSS-LINKED GEL MODELING COMPOSITION capable of assuming various colors which is cohesively strong but pliable and ductile. The compound is formed by combining a wood flower to a water-based gel using cross linkable guar gum as a gellant.

U.S. Pat. No. 4,701,329 issued to Nelson, et al. sets forth a CALCIUM FORTIFIED MILK in which a fortified milk formula is made by the addition of a tribasic calcium phosphate, carrageenan and guar gum combined with fresh milk.

While certain of the foregoing described play material compositions have enjoyed some commercial success and provided amusement and entertainment, there remains a continuing need in the art for evermore improved and varied play material compositions.

SUMMARY OF THE INVENTION

Accordingly, it is a general object of the present invention to provide an improved play material. It is a more particular object of the present invention to provide an improved play material which reduces eye and skin irritation on the part of play material users.

In accordance with the present invention, there is provided a play material comprises: a self cross-linking sodium alginate; a glycerin solution in excess of 90 percent; germaben II-E preservative; butylparaben preservative; sodium chloride; and water.

BRIEF DESCRIPTION OF THE DRAWING

The features of the present invention, which are believed to be novel, are set forth with particularity in the appended claims. The invention, together with further objects and advantages thereof, may best be understood by reference to the following description taken in conjunction with the accompanying drawing, in which:

FIG. 1 sets forth a flow diagram of the process for manufacturing the present invention play material.

DESCRIPTION OF THE PREFERRED EMBODIMENT

FIG. 1 sets forth a flow diagram of the manufacturing process for producing the present invention play material. The process begins at a step 10 in which a predetermined quantity of distilled water is measured into the mixing chamber. The process then moves to a step 11 in which predetermined quantities of germaben II-E and butylparaben are mixed while the mixture is simultaneously heated. The process then moves to a step 12 in which the mixing and heating continues afterwhich the process moves to a step 13 in which the mixture temperature is measured. At a decision step 14, a determination is made as to whether the mixture formed in steps 11 and 12 has reached eighty degrees Centigrade. In the event the temperature has not reach eighty degrees Centigrade, the process returns to steps 12 and 13 for continued mixing and heating together with temperature measurement until the temperature reach eighty degrees Centigrade at step 14. Once a determination is made that the mixture temperature has reached eighty degrees Centigrade, the process moves to a step 15 in which sodium alginate is added to the mixture formed in steps 11 and 12. Thereafter, the process moves to a step 16 in which the mixture now containing sodium alginate is continuously mixed and cooled to a temperature between thirty degrees Centigrade and forty degrees Centigrade. Once the desired temperature is reached, the mixing process continues at a step 17 until a homogeneous mixture is achieved. At step 18, a determination is made as to whether the mixture has become completely homogeneous. So long as the mixture is not completely homogeneous at step 18, the process returns through step 17 and continues mixing.

Once the mixture has been found to be completely homogeneous at step 18, the process moves to a step 19.

In a separate container, the process at a premixing step 23 provides a premix of glycerin and colorant materials which are added to the existing homogeneous mixture at process step 19. The process then moves to a step 20 in which sodium chloride is added and mixed into the existing mixture. Thereafter, the mixing process continues at a step 21 until the resulting mixture is once again completely homogeneous. Once a homogeneous mixture has been obtained, the material is transferred at step 22 to a storage tank to await later distribution and use by the consumer.

The present invention play material exhibits an extremely elastic and interesting flow characteristic which provides substantial interest and enjoyment on the part of users. Concurrently, the formula and process set forth herein provides a play material which substantially avoids skin and eye irritation problems associated with many types of prior art play materials. The present invention play material is produced using the above-described process in accordance with the following formula:

TABLE I

| INGREDIENTS | PERCENT BY WEIGHT |
|---|---|
| SELF CROSS-LINKING SODIUM ALGINATE | 2.5 to 4.0 |
| GLYCERIN (99%) | 1.00–3.50 |
| COLORANT | 0.058 |
| DI-WATER | q.s. to 100 |
| GERMABEN II-E | 1.35 |
| BUTYLPARABEN | 0.005 |
| SODIUM CHLORIDE | 2.00–7.00 |

In the formula set forth above, the sodium alginate preferred comprises a self cross-linking sodium alginate such as the alginate blend having type number K1B374, manufactured by Kelco Corporation. The glycerin solution utilized comprises a 99 to 99.5 percent solution. While the colorant used in the formula set forth in Table I is, to some extent, a matter of design preference, it has been found preferable generally to utilize colorants which are pigments in order to avoid imparting a staining characteristic to the play material. Thus, for example, the colorant set forth in the formula of Table I may include saturn yellow T-176 and horizon blue T-19 both manufactured by Day Glo Corporation.

The formula set forth above also includes sodium chloride together with a preservative formed by germaben II-E together with butylparaben. The combined germaben II-E and butylparaben, together with the sodium chloride, control yeast, fungus, mold and pathogenic bacteria. In the formula set forth above, the quantities of germaben II-E and butylparaben used permit the present invention play material to readily meet and pass all standard tests relating to eye and skin irritation as well as oral toxicity and other microbial susceptibility tests. The sodium chloride presence within the present invention formula performs a dual role of providing a preservative while simultaneously increasing the firmness of the alginate gel formed. The germaben II-E is manufactured by Sutton Laboratories while the butylparaben is manufactured by Spectrum Corporation.

While the formula set forth above in Table I provides for variation of the percentages by weight of glycerin and sodium chloride ingredients which provide for variation of the firmness and viscosity characteristics and some handling characteristic of the present invention play material, a preferred formula is provided by the following quantities of ingredients set forth below in Table II.

TABLE II

| INGREDIENT | PERCENT BY WEIGHT |
|---|---|
| SODIUM ALGINATE | 3.33 |
| GLYCERIN (99.5%) | 1.50 |
| COLORANT: | |
| SATURN YELLOW T-17 | .0465 |
| HORIZON BLUE T-19 | .0115 |
| DI-WATER | q.s. to 100 |

TABLE II-continued

| INGREDIENT | PERCENT BY WEIGHT |
| --- | --- |
| GERMABEN II-E | 1.35 |
| BUTYLPARABEN | 0.005 |
| SODIUM CHLORIDE | 4.00 |

The material provided by the relative percentages of ingredients shown in Table II is similar to a play material previously manufactured and sold by Mattel, Inc. under the trademark "SLIME". Thus, the play material provided by the formula of Table II exhibits elastic properties while concurrently providing an easily manipulatable firmness and viscosity together with a tendency to adhere to other play objects and surfaces. The use of the selected colorants in the proportions set forth in the formula of Table II provides a highly desirable somewhat transparent neon characteristic to the present invention play material. It will be apparent to those skilled in the art, however, that other colorants may be used to achieve other color effects without departing from the spirit and scope of the present invention.

What has been shown is novel play material having an alginate base which provides exciting play characteristics and which simultaneously reduces the possibility of eye and skin irritation on the part of the users. The material may be readily manufactured using commercially available ingredients and may readily be manufactured in commercial quantities using typical commercial manufacturing processes.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A play material comprising:
   2.5 to 4.0 percent by weight of a self cross-linking sodium alginate;
   1.0 to 3.5 percent by weight of a glycerin and water solution in excess of 90 percent glycerin;
   a preservative;
   about 4.0 percent by weight sodium chloride; and
   water.

2. A play material as set forth in claim 1 further including 0.04 to 0.08 percent by weight of a colorant.

3. A play material as set forth in claim 2 wherein said self cross-linking sodium alginate is about 3.33 percent by weight.

4. A play material wherein the play material includes percent by weight:

| SELF CROSS-LINKING SODIUM ALGINATE | 3.33 |
| --- | --- |
| GLYCERIN (99%) | 1.00–3.50 |
| COLORANT | 0.058 |
| DI-WATER | q.s. to 100 |
| PRESERVATIVE | 1.355 |
| SODIUM CHLORIDE | 2.00–7.00 |

5. A play material consisting essentially of by weight 3.33 percent self cross-linking sodium alginate; 1.0 to 3.5 percent glycerin; 0.06 percent colorant; 1.355 percent preservative; 2.0 to 7.0 percent sodium chloride; and water as needed to complete to 100 percent.

* * * * *